(12) United States Patent
Artmann et al.

(10) Patent No.: US 11,110,581 B2
(45) Date of Patent: Sep. 7, 2021

(54) COIL SPACING (71) Applicant: Hilti Aktiengesellschaft, Schaan (LI)

(72) Inventors: Konrad Artmann, Schondof (DE); Thomas Schaefer, Obermeitingen (DE); Markus Hartmann, Mauerstetten (DE); Norbert Daam, Oberdiessen (DE)

(73) Assignee: Hilti Aktiengesellschaft, Schaan (LI)

( * ) Notice: Subject to any disclaimer, the term of this patent is extended or adjusted under 35 U.S.C. 154(b) by 106 days.

(21) Appl. No.: 16/466,715

(22) PCT Filed: Nov. 9, 2017

(86) PCT No.: PCT/EP2017/078697
§ 371 (c)(1),
(2) Date: Jun. 5, 2019

(87) PCT Pub. No.: WO2018/103988
PCT Pub. Date: Jun. 14, 2018

(65) Prior Publication Data
US 2019/0308306 A1 Oct. 10, 2019

(30) Foreign Application Priority Data
Dec. 9, 2016 (EP) .................................. 16203113

(51) Int. Cl.
*B25D 17/20* (2006.01)
*B25D 11/06* (2006.01)
(Continued)

(52) U.S. Cl.
CPC ............ *B25D 17/20* (2013.01); *B25D 11/064* (2013.01); *B25D 16/00* (2013.01); *H02K 3/24* (2013.01);
(Continued)

(58) Field of Classification Search
CPC ........ B25D 17/20; B25D 17/22; B25D 11/00; B25D 11/06; B25D 11/064; H02K 9/06; H02K 33/12; H02K 3/04; H02K 3/24
(Continued)

(56) References Cited

U.S. PATENT DOCUMENTS

| | | | |
|---|---|---|---|
| 469,441 A | 2/1892 | Wightman | |
| 1,753,454 A * | 4/1930 | Weyandt | H02K 33/12 310/30 |

(Continued)

FOREIGN PATENT DOCUMENTS

| | | |
|---|---|---|
| GB | 1378987 | 1/1975 |
| WO | WO2010/117127 | 10/2010 |

OTHER PUBLICATIONS

International Search Report of PCT/EP2017/078697, dated Aug. 1, 2018.

*Primary Examiner* — Nathaniel C Chukwurah
*Assistant Examiner* — Jacob A Smith
(74) *Attorney, Agent, or Firm* — Davidson, Davidson & Kappel, LLC (57) ABSTRACT

A power tool (1) is provided, especially a hammer drill and/or a chiseling hammer drill, including a percussive mechanism (12) with a percussive element (13) to generate a percussive pulse onto a tool (1), the element being reversibly movable along a longitudinal axis (R) by a magnetic field in order to generate the percussive pulse, and including at least a first and a second coil device (1, 2) to generate the magnetic field. Each coil device (1, 2) has at least a first coil ring (3) with a first radius (R1) and a second coil ring (4) with a second radius (R2), whereby the first radius (R1) of the first coil ring (3) is greater than the second radius (R2) of the second coil ring (4), so that a space (S) is formed, at least in certain areas, between the at least first and second
(Continued)

coil rings (3, 4), whereby a fluid (L), especially an air stream, that serves to cool the coil device (1, 2) can flow through the space.

19 Claims, 9 Drawing Sheets

(51) Int. Cl.
*B25D 16/00* (2006.01)
*H02K 3/24* (2006.01)
*H02K 33/12* (2006.01)
*H02K 7/14* (2006.01)
*H02K 9/06* (2006.01)
*H02K 9/02* (2006.01)

(52) U.S. Cl.
CPC .............. *H02K 7/145* (2013.01); *H02K 9/02* (2013.01); *H02K 9/06* (2013.01); *H02K 33/12* (2013.01); *B25D 2217/0061* (2013.01); *B25D 2250/145* (2013.01); *H02K 2213/03* (2013.01)

(58) Field of Classification Search
USPC ..................................................... 173/1, 217
See application file for complete search history.

(56) References Cited

U.S. PATENT DOCUMENTS

| | | | | |
|---|---|---|---|---|
| 1,797,253 A * | 3/1931 | Weyandt | ................ | B25D 17/20 318/125 |
| 1,920,673 A | 8/1933 | Baker et al. | | |
| 2,248,110 A * | 7/1941 | Murphy | ................ | H02K 33/12 310/30 |
| 2,861,778 A * | 11/1958 | Spurlin | ................ | B25D 11/064 173/117 |
| 2,949,909 A * | 8/1960 | Macchioni | ............ | B25D 17/20 173/117 |
| 3,149,255 A * | 9/1964 | Trench | ................... | H02K 33/06 310/30 |
| 4,553,074 A | 11/1985 | Georges et al. | | |
| 6,943,473 B2 * | 9/2005 | Furuse | ................... | H02K 16/02 310/112 |
| 7,023,121 B2 * | 4/2006 | Kusase | .................... | H02K 1/16 310/156.66 |
| 7,812,500 B1 * | 10/2010 | Ham | ...................... | H02K 16/02 310/266 |
| 2003/0006051 A1 * | 1/2003 | Schmitzer | ............ | B25D 17/043 173/49 |
| 2009/0072649 A1 * | 3/2009 | Rottmerhusen | ........ | H02K 21/16 310/156.32 |
| 2010/0156205 A1 * | 6/2010 | Davis | .................. | H02P 25/0925 310/46 |
| 2016/0226339 A1 * | 8/2016 | Niwa | ..................... | H02K 5/225 |
| 2018/0099395 A1 * | 4/2018 | Iida | ..................... | B25D 16/006 |

* cited by examiner

COIL SPACING

The present invention relates to a power tool, especially to a hammer drill and/or a chiseling hammer drill, comprising a percussive mechanism having a percussive element to generate a percussive pulse onto a tool, said element being reversibly displaceable along a longitudinal axis by means of a magnetic field in order to generate the percussive pulse, and comprising at least a first and a second coil device to generate the magnetic field.

BACKGROUND

Hand-held power tools, which for the most part are electrically driven, are employed for drilling as well as for chiseling when it comes to drilling work in the installation sector as well as in demolition, etc. The hand-held hammer drills and/or chiseling hammer drills normally have a drive that is arranged in a device housing and that actuates a drilling or chiseling tool clamped in a tool socket. For purposes of improving the demolition performance during drilling and especially for chiseling, the devices are equipped with a percussive mechanism that, during operation, generates axial strikes or percussive pulses which are exerted onto the tool clamped in the tool socket. Several solutions for generating periodical axial strikes are known from the state of the art.

Aside from essentially mechanically excited percussive mechanisms, the state of the art has also proposed electromagnetic percussive mechanisms in which a magnetizable striking plunger is operated in a magnetic field inside a coil. For example, U.S. Pat. No. 4,553,074 discloses an electromagnetic percussive mechanism in which a striking plunger operates in an electric field inside a cylindrical stator coil. When a current pulse is applied to the coil, the striking plunger is accelerated in the direction of the tool clamped in the tool socket. Once the impact has been delivered, the striking plunger recoils and is moved in the opposite direction, for instance, by a return spring. In order to return the striking plunger, it is also possible to employ a reverse-poled magnetic field instead of a return spring. Subsequently, the striking procedure starts anew.

A problematic aspect often encountered with the above-mentioned electromagnetic percussive mechanisms according to the state of the art is that of excessive heat generation by the coils which, among other things, can cause damage to and/or failure of a component or of the entire percussive mechanism. Before this backdrop, the objective of the present invention is to put forward a power tool, especially a hammer drill and/or a chiseling hammer drill, comprising a percussive mechanism with a percussive element to generate a percussive pulse onto a tool, by means of which the above-mentioned problem can be solved and especially so that the probability of damage to and/or failure of a component or of the entire percussive mechanism can be reduced.

SUMMARY OF THE INVENTION

The present invention provides a power tool, especially a hammer drill and/or a chiseling hammer drill, comprising a percussive mechanism with a percussive element to generate a percussive pulse onto a tool, said percussive element being reversibly movable along a longitudinal axis by means of a magnetic field in order to generate the percussive pulse, and comprising at least a first and a second coil device to generate the magnetic field.

According to the invention, it is provided for the power tool to be such that each coil device has at least a first coil ring with a first radius and a second coil ring with a second radius, whereby the first radius of the first coil ring is greater than the second radius of the second coil ring, so that a space is formed, at least in certain areas, between the at least first and second coil rings, whereby a fluid, especially an air stream, that serves to cool the coil device can flow through said space.

This makes it possible for cooling air to flow through between the individual coil rings, thereby countering the generation of heat on the coils and on the coil device in its entirety. A reduced heat generation diminishes the probability of damage to and/or failure of a component or of the entire percussive mechanism. Moreover, the division of the coil device into several coil rings reduces the individual size and height of the coil winding that generates the heat.

Each coil ring is a component of one or more windings of an electric conductor of the coil device for generating the magnetic field. In this context, each coil ring can have its own winding coil, which is separated from the other windings. According to an advantageous embodiment of the present invention, it can be provided for the coil device to have more than a first and second coil ring with corresponding spaces that are present between the individual coil rings, at least in certain areas. In this manner, the coil device can be further divided into individual coil rings, so that additional spaces can be provided accordingly in order to cool the coil device. The configuration of the coil device with more than a first and second coil ring is particularly advantageous in the case of coils having larger diameters and a high number of windings. The higher the number of windings consisting of electric conductors and the higher the number of electric conductors positioned above each other, the greater the generation of heat in or on the coils.

According to another embodiment, it can also be seen as advantageous for the at least first and second coil rings to be arranged in a vertical plane. As a result, the total length of the coil device can be shortened, thus saving space inside the power tool.

According to another advantageous embodiment, it can be provided for each coil ring to have a maximum of two to fourteen winding layers, preferably seven or eight winding layers, for an electric conductor. The electric conductor can be configured as a wire. It has been found that limiting the number of winding layers of an electric conductor to two to twelve winding layers can prevent excessive heat generation in or on the coils, so that sufficient cooling can be achieved due to the space between the coil rings.

According to an advantageous embodiment of the present invention, it can be provided for the individual coil rings to be arranged with respect to each other in such a way that the distance between an upper end of the uppermost coil ring and a lower end of the lowermost coil ring is greater than the sum of the first height of the uppermost coil ring and of the second height of the lowermost coil ring. In this manner, a virtually optimal relationship between the height of the individual coil ring and the space can be achieved in order to cool the coil rings. According to another advantageous embodiment, it can be provided for the space between the at least first and second coil rings to have a height of 2 mm to 10 mm. In this manner, a virtually optimal height of the space can be achieved between the individual coil rings as far as the cooling effect is concerned. Additional advantages can be gleaned from the description of the figures below. The figures depict several embodiments of the present invention. The figures, the description and the claims contain numerous features in combination. The person skilled in the art will advantageously also consider the features individually and merge them to form additional meaningful combinations.

BRIEF DESCRIPTION OF THE DRAWINGS

Identical and similar components are provided with the same reference numerals in the figures. The following is shown.

DETAILED DESCRIPTION OF EMBODIMENTS

Figure 1:
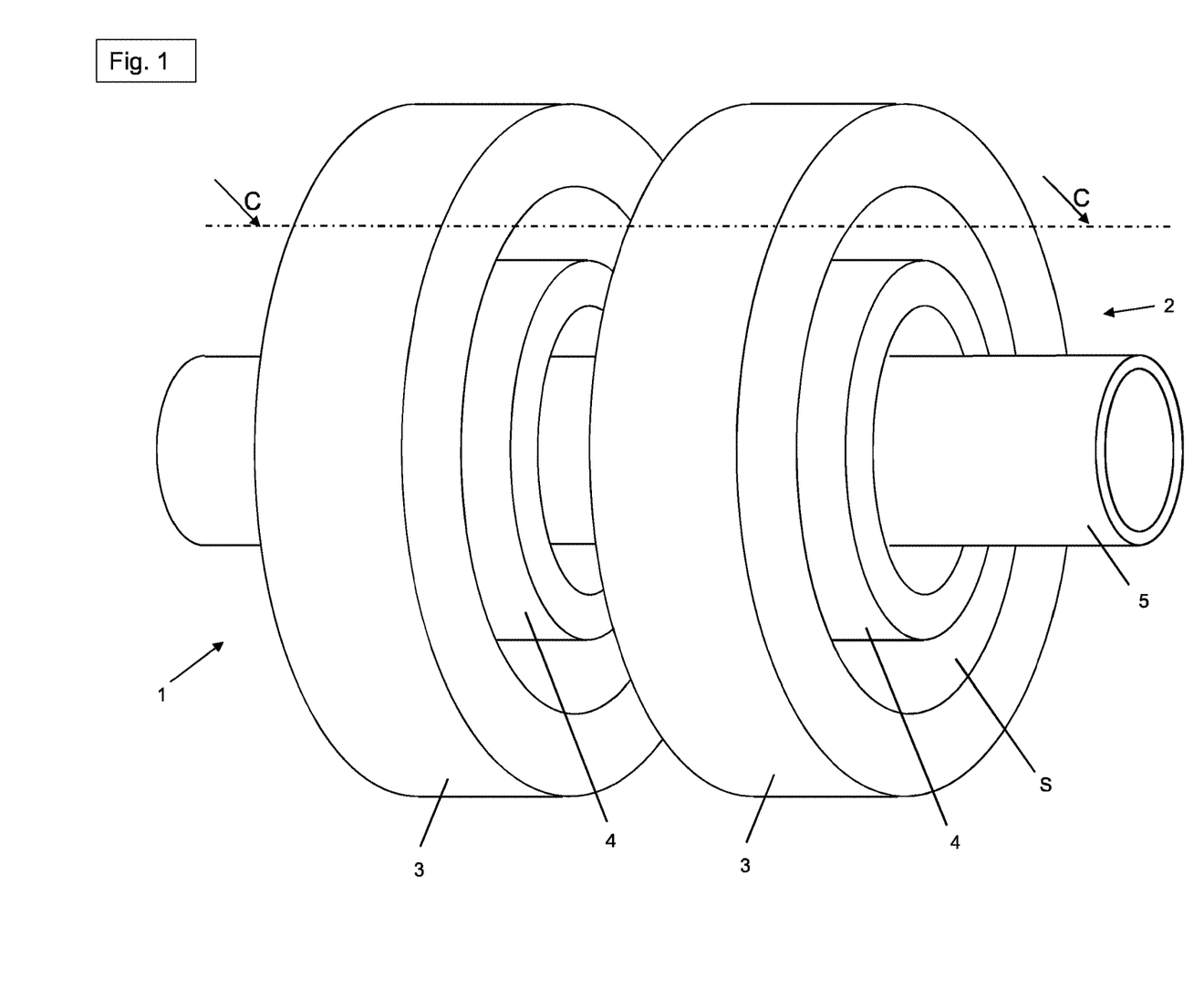
FIG. 1: a schematic depiction of a first and second coil device, each having a first and second coil ring as components of a percussive mechanism of a power tool.

FIG. 1 shows a first coil device 1 and a second coil device 2. The first coil device 1 has a first coil ring 3 as well as a second coil ring 4. The coil rings 3, 4 are positioned around a sleeve 5. The first as well as the second coil devices 1, 2 are components of a percussive mechanism 12 of a power tool 7.

The power tool 7 is configured in the form of a chiseling hammer drill. The power tool 7 configured as a chiseling hammer drill essentially has a device housing 8, a handle 9 and a tool socket 10 to hold a tool 11, for instance, a drill bit or chisel.

The rear end of the handle 9 is connected to the device housing 8 in the direction N and it has a power switch with which the power tool 7 configured as a chiseling hammer drill can be switched on. The power switch is not shown in the figures. The electrically driven power tool 7 can be connected via a connection cable to a source of power, for example, an outlet, in order to be supplied with energy. The connection cable, the outlet and the power source are not shown in the figures.

Moreover, inside the device housing 8, there is a percussive mechanism 12 that is preferably arranged coaxially with respect to the tool socket 10 and to the tool 11 placed therein. The tool 11 is configured in the form of a chisel.

The percussive mechanism 12 essentially comprises the first coil device 1 and the second coil device 2, the sleeve 5 as well as a percussive element 13. The percussive element 13 is positioned inside the sleeve 5 and it can be reversibly moved back and forth periodically along the axis R of the percussive mechanism 12 in the direction M or N. A spring 14 is positioned at the rear end of the sleeve 5 as seen in the direction N. The spring 14 is configured in the form of a helical spring. However, it is also possible for the spring 14 to be configured in the form of an air spring. During the forward movement in the direction M or in the direction of the tool 11 that is clamped into the tool socket 10, the percussive element 13 strikes the rear end of the tool 11 or of an intermediate striking pin element 15. In this process, the percussive element 13 releases a large portion of its kinetic energy to the tool 11 in a pulsed manner. The kinetic energy transmitted to the tool 11 in a pulsed manner can be used to work (chisel) a mineral material (e.g. rock). The mineral material is not shown in the figures. The spring 14 situated in the rear part of the sleeve 5 serves to brake and return the percussive element 13 once the percussive element 13 has moved in the direction N and then has to be moved back in the direction M.

The percussive mechanism 12 depicted in the figures is based on the principle of polarized reluctances and essentially comprises a first and second coil device 1, 2. The coil devices 1, 2 can generate a magnetic field in which the percussive element 13 can periodically be reversibly moved axially in the directions M and N.

A fan 16 is arranged behind the first and second coil devices 1, 2 in the direction N. The fan 16 has an impeller 17 that can rotate around the sleeve 5, thus generating an air stream L. The air stream L generated by the fan impeller 17 draws ambient air into the interior of the device housing 8 via the rear ventilation openings 18. As described below in detail, the air for the cooling flows through the coil devices 1, 2 and especially through the first and second coil rings 3, 4. The air stream then finally exits the device housing 8 via the front ventilation openings 19.

Figure 2:
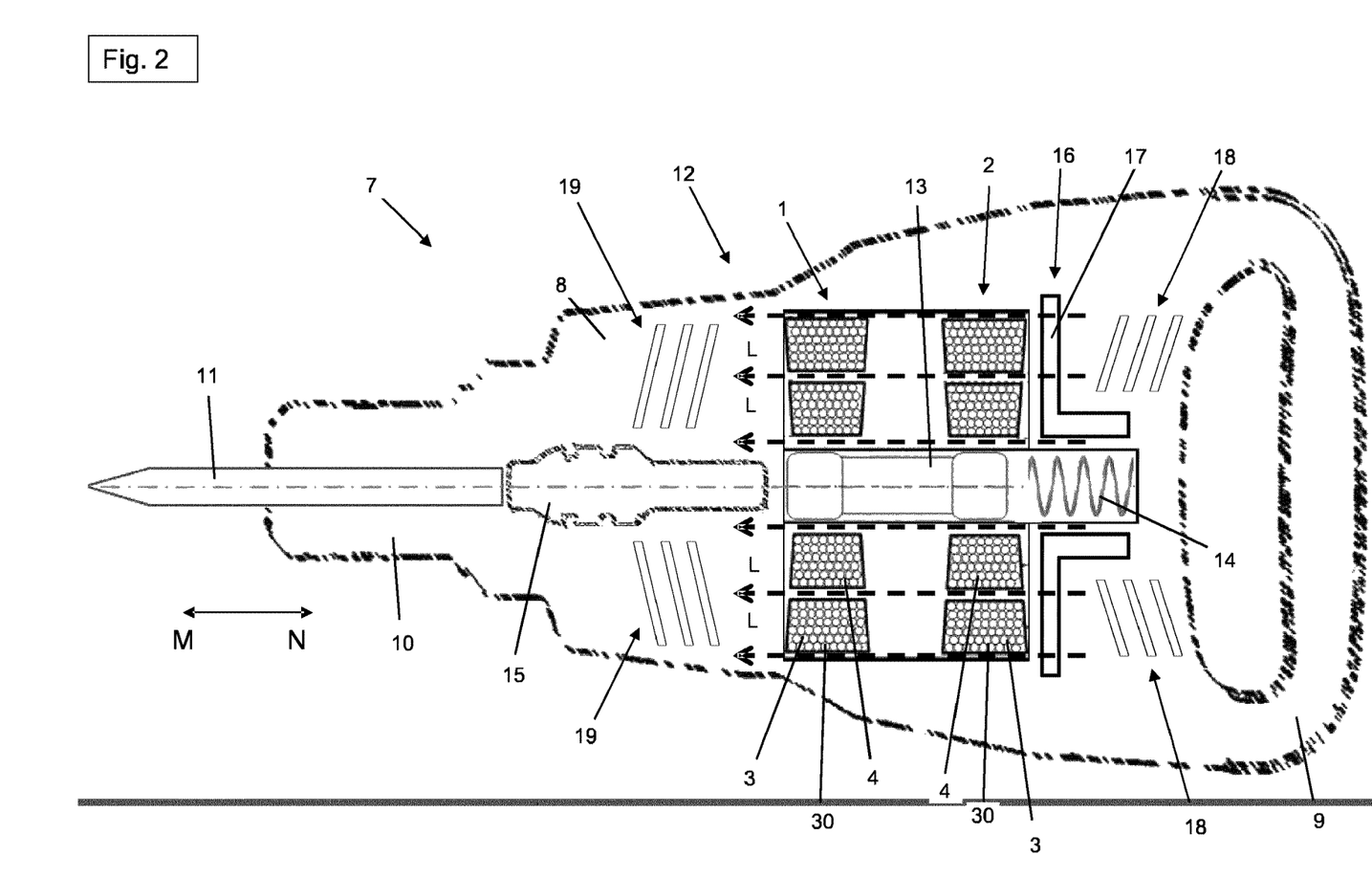
FIG. 2: a sectional view through an embodiment of a power tool according to the invention with a percussive mechanism as well as a first and second coil device according to a first embodiment.
Figure 3:
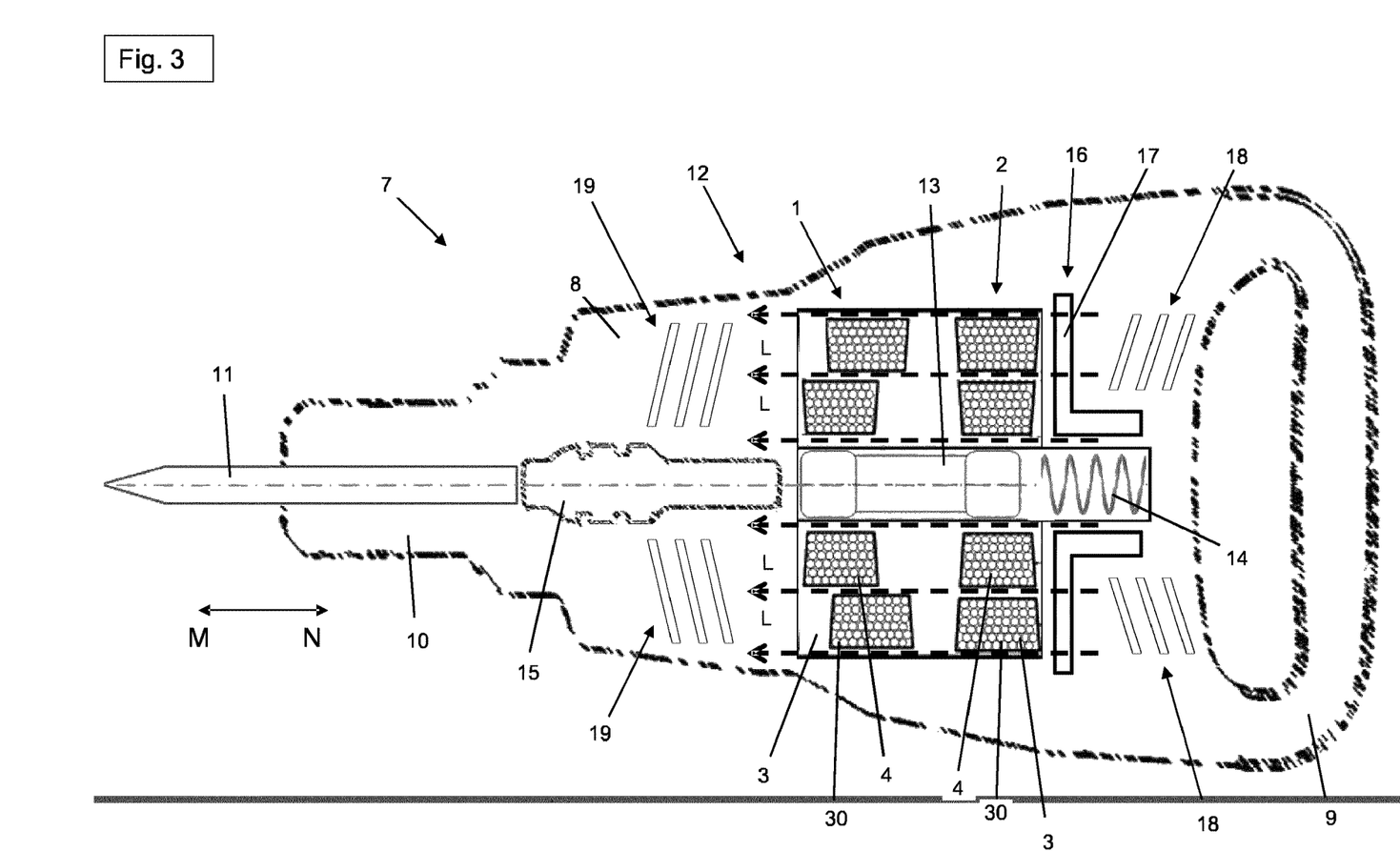
FIG. 3: a sectional view through an embodiment of the power tool according to the invention with a percussive mechanism as well as the first and second coil device according to another embodiment.

In FIGS. 2 and 3, the first or second coil device 1, 2 is shown as a component of the percussive mechanism 12 in the interior of the power tool 11 configured as a chiseling hammer drill.

Figure 4:
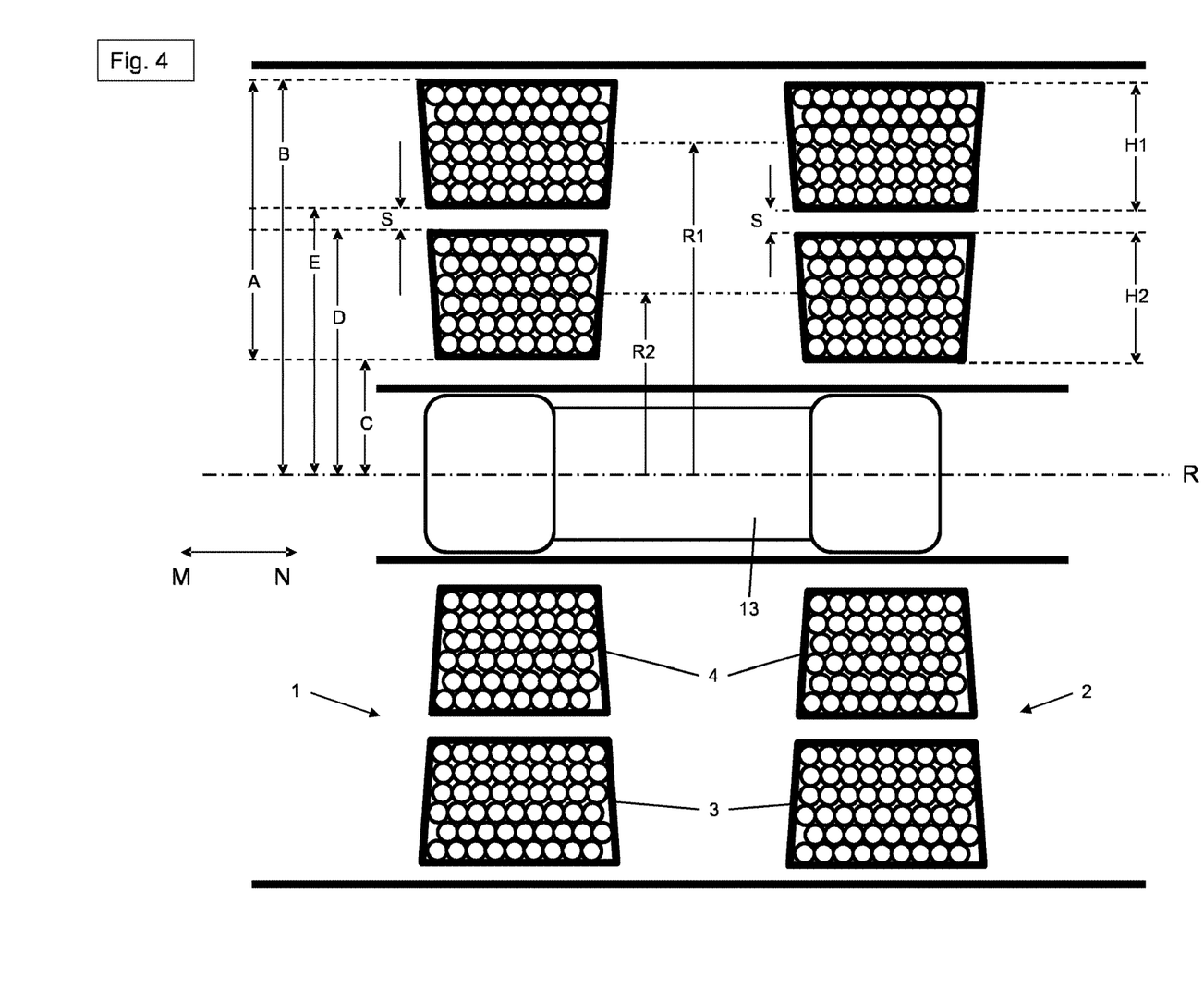
FIG. 4: a sectional view along section C-C in FIG. 1 through a first and a second coil device according to the first embodiment.

FIGS. 2 and 4 show the first and second coil devices 1, 2 according to a first embodiment. Each coil device 1, 2 has a first coil ring 3 and a second coil ring 4. The first coil ring 3 as well as the second coil ring 4 are configured so as to be circular. The first coil ring 3 has a first radius R1 while the second coil ring 4 has a second radius R2; see FIGS. 4 and 7. The radius R1 extends from the axis R to approximately the center of the first coil ring 3 while the radius R2 extends from the axis R to approximately the center of the second coil ring 4.

According to the first embodiment, the first and second coil devices 1, 2 are configured essentially identically, that is to say, in the first and second coil devices 1, 2, the cross-sectional surface area Q3 of the first coil ring 3 is essentially the same size as the cross-sectional surface area Q4 of the second coil ring 4. Moreover, the first and second coil rings 3, 4 are positioned in a plane with respect to each other. This plane extends essentially vertically. The second coil ring 4 is thus located inside the first coil ring 3.

According to another embodiment, the coil devices 1, 2 can also be configured in such a way that the first and second coil rings 3, 4 are not positioned in a vertical plane with respect to each other. As is shown in FIG. 3, in the case of the first coil device 1, the first coil ring 3 is arranged offset in a direction N relative to the second coil ring 4. In the case of the second coil device 2, however, the first and second coil rings 3, 4 are arranged inside each other in a vertical plane relative to each other, that is to say, they are inside one another.

Figure 5:
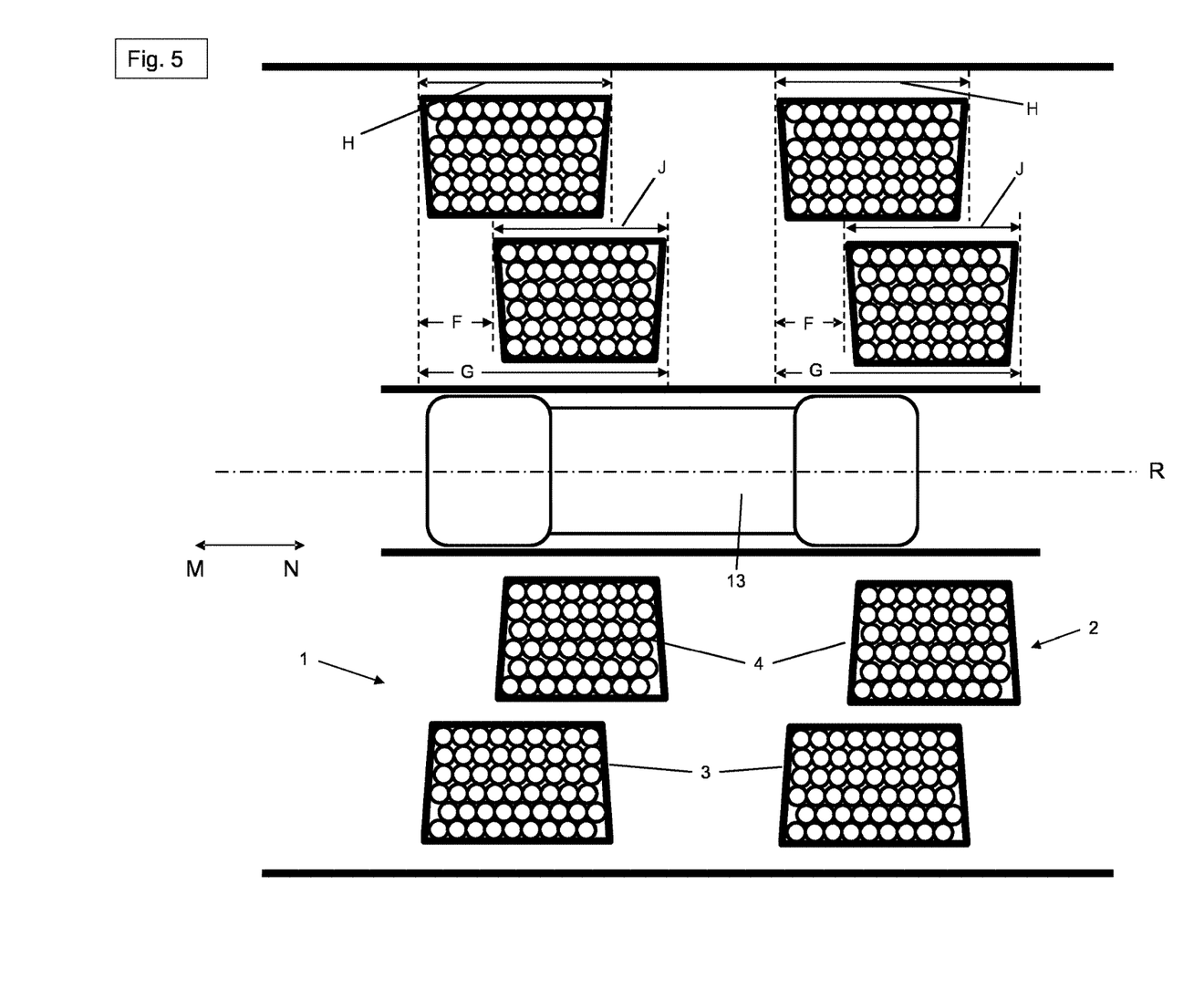
FIG. 5: a sectional view along section C-C in FIG. 1 through the first and second coil devices according to another embodiment.

According to another embodiment of the coil device 1, 2 shown in FIG. 5, it is likewise possible for the second coil ring 4 of the first and second coil devices 1, 2 to be arranged offset in the direction N relative to the first coil ring 3 of the first and second coil devices 1, 2.

However, it is also possible for the second coil ring 4 of the first and second coil devices 1, 2 to be arranged offset in the direction M relative to the first coil ring 3 of the first and second coil devices 1, 2. Owing to the offset arrangement of the first and second coil rings 3, 4 relative to each other, an air gap that extends essentially vertically can be formed between the first and second coil rings so that cooling air L generated by the fan impeller 17 can flow through said air gap.

Figure 6:
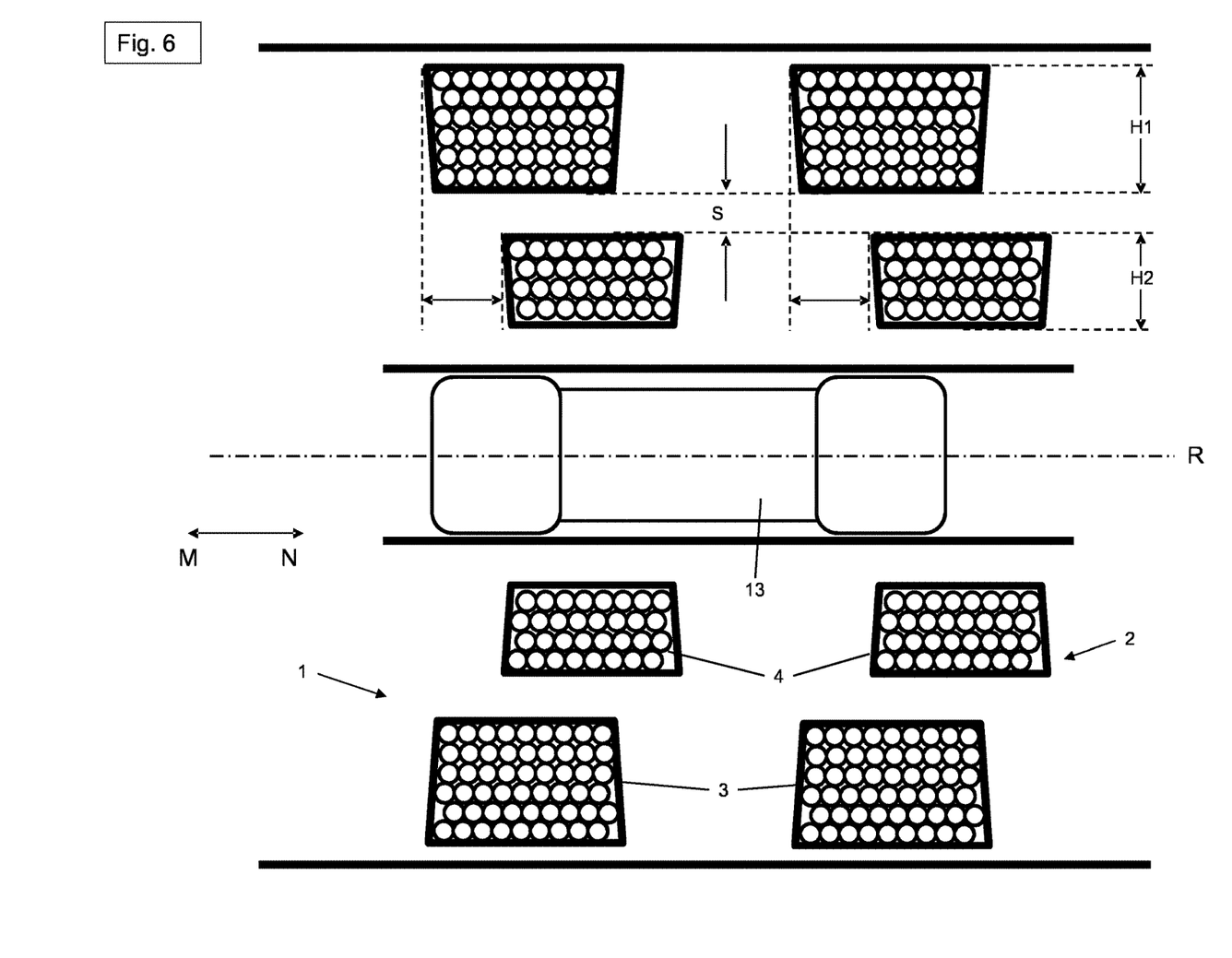
FIG. 6: a sectional view along section C-C in FIG. 1 through the first and second coil devices according to another embodiment.

According to another embodiment of the coil devices 1, 2 shown in FIG. 6, it is likewise possible for the second coil ring 4 of the first and second coil devices 1, 2 to be arranged offset in the direction N relative to the first coil ring 3 of the first and second coil devices 1, 2 and for the cross-sectional surface area Q4 of the second coil ring 4 of the first and second coil devices 1, 2 to be smaller than the cross-sectional surface area Q3 of the first coil ring 3 of the first and second coil devices 1, 2.

According to an alternative embodiment, it is also possible for the first and/or second coil ring 3,4 to be configured so as not to be circular, but rather, so as to be polygonal or to have some other suitable shape. In this context, it is also possible for the coil rings 3, 4 to have an oval or asymmetrical shape.

As is shown in FIGS. 2 to 6, each coil ring 3, 4 has a number of windings of an electrically conductive wire 30. As is especially shown in FIGS. 2 and 5, the continuous wire 30 is arranged in rows or layers over each other. The wire 30 is wound in six rows in each coil ring 3, 4.

Figure 9:
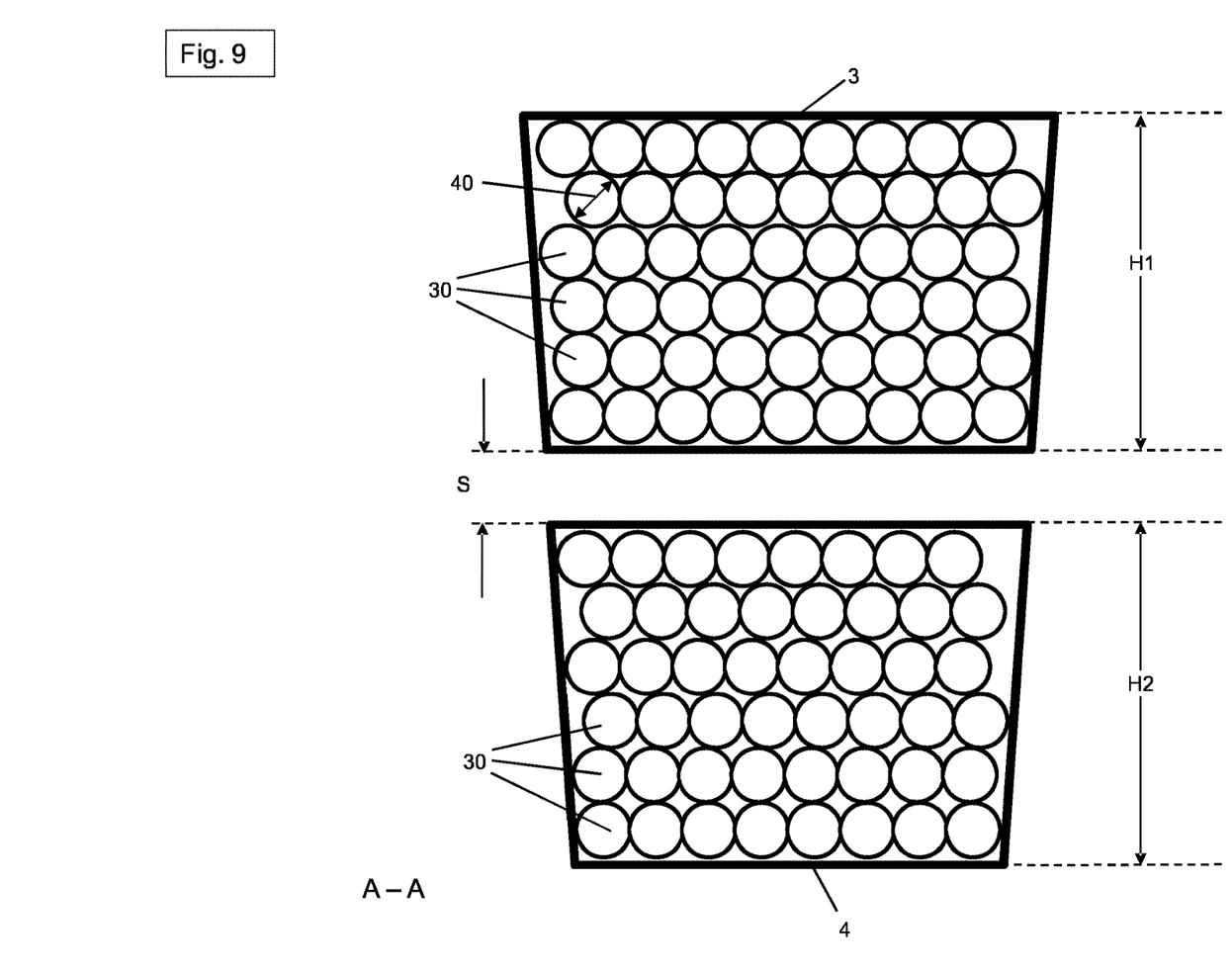
FIG. 9 a sectional view through the coil device having the first and second coil rings along section A-A in FIG. 7.

According to an alternative embodiment, however, it is also possible for a maximum of two to fourteen rows or winding layers of the wire 30 to be arranged over each other in each coil ring 3, 4. Particularly advantageously, there are seven or eight winding layers or rows of the wire 30 laid over each other. The height H1 of the first coil ring 3 as well as the height H2 of the second coil ring 4 can amount to two to ten times the diameter 40 of the wire 30; see FIG. 9. As is shown in FIG. 4, the heights H1, H2 of the individual coil rings 3, 4 and the arrangement of the individual coil rings 3,4 are configured in such a way that a distance A between an upper end of the uppermost or first coil ring 3 and a lower end of the lowermost or second coil ring 4 is greater than the sum of the first height H1 of the uppermost or first coil ring 3 and the second height H2 of the lowermost or second coil ring 4. This yields a space S between the first and second coil rings 3,4. The position and function of the space S will be described in detail below. As can also be seen in FIG. 4, the distance between the lower end of the lower or second coil ring 4 and the longitudinal axis R is designated by the reference letter C. The distance between the upper end of the lower or second coil ring 4 and the longitudinal axis R is designated by the reference letter D. The difference between the distances C and D is the height H2 of the lower or second coil ring 4.

Consequently, the distance A corresponds to the difference between distances B and C. Moreover, distance A is always greater than the sum of the heights H1 and H2. Distance A is likewise greater than the sum of the difference between B and E as well as the difference between D and C.

The distance between the lower end of the upper or first coil ring 3 and the longitudinal axis R is designated by reference letter E. The distance between the upper end of the upper or first coil ring 3 and the longitudinal axis R is designated by the reference letter B. The difference between distances B and E is the height H1 of the upper or first coil ring 3.

Figure 7:
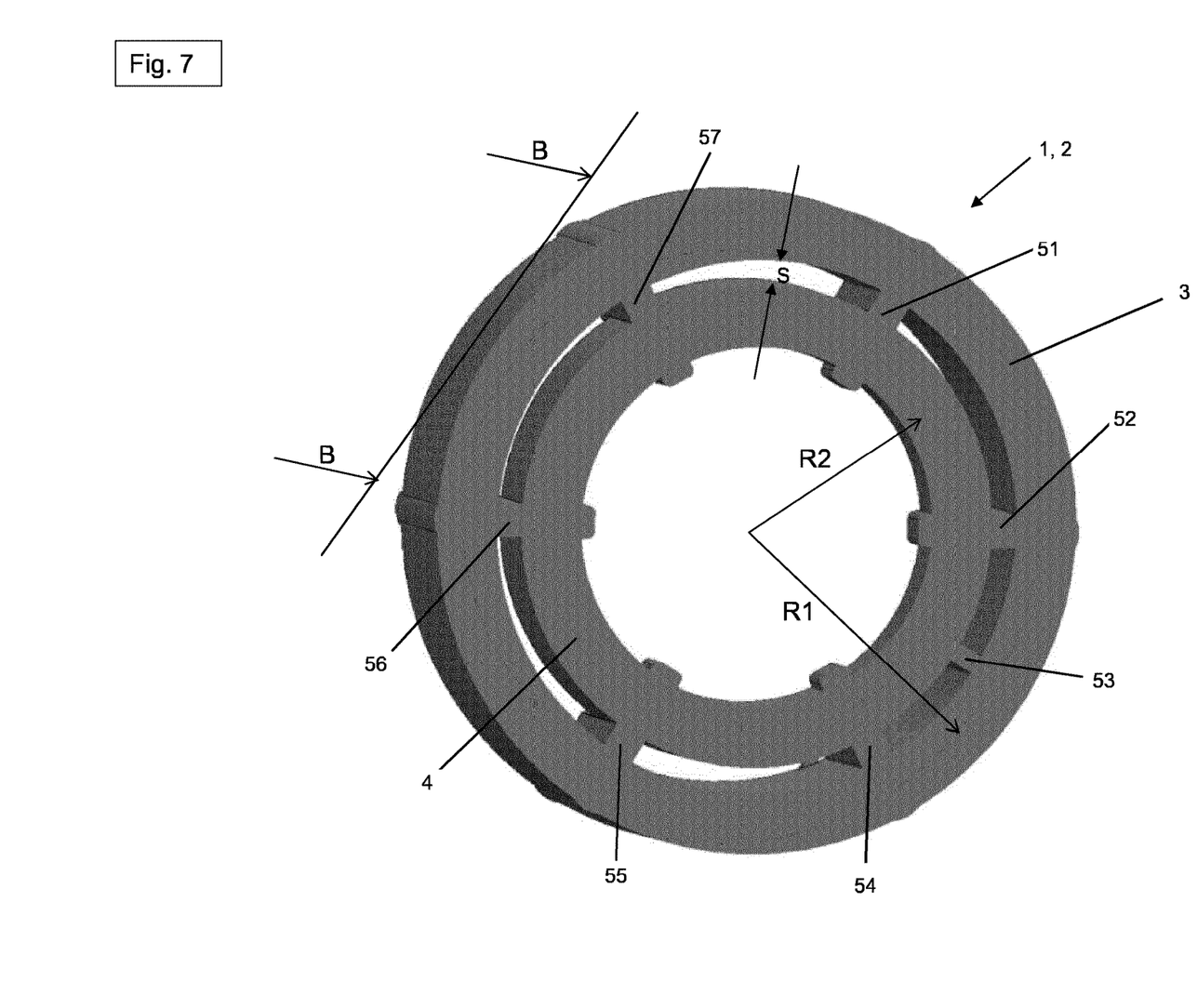
FIG. 7: a perspective view of the coil device with a first and second coil ring.

Moreover, the first coil ring 3 has a first radius R1 while the second coil ring 4 has a second radius R2. As can be seen in FIGS. 4 and 7, the radius R1 is greater than the radius R2. The second coil ring 4 is positioned inside the first coil ring 3. The first and the second coil rings 3, 4 are situated in the same plane as well as parallel to each other.

As already mentioned above, FIG. 5 shows another embodiment of the coil device 1, 2. The second coil ring 4 of the first and second coil devices 1, 2 is arranged offset by a distance F in the direction N relative to the first coil ring 3 of the first and second coil devices 1, 2. The width G or the distance from the left-hand side edge of the first coil ring 3 to the right-hand side edge of the second coil ring 4 is precisely the same as the sum of the maximum width H of the first coil ring 3 and the maximum width J of the second coil ring 4. However, it is also possible for the width G or the distance from the left-hand side edge of the first coil ring 3 to the right-hand side edge of the second coil ring 4 to be smaller than the sum of the height H of the first coil ring 3 and the width J of the second coil ring 4. As already mentioned above, FIG. 6 shows a possible configuration of the coil devices 1, 2 in which the first and second coil rings 3, 4 have cross-sectional surface areas Q3, Q4 of different sizes. In the embodiment shown, the cross-sectional surface area Q4 of the second coil rings 4 is smaller than the cross-sectional surface areas Q3 of the first coil rings 3. As can be seen in FIG. 6, the height H1 of the first coil rings 3 is greater than height H2 of the second coil rings 4. As a result, the space S between the coil rings 3,4 is enlarged. The distance between the lower edge of the second coil ring 4 and the sleeve 5 is likewise enlarged. Consequently, more cooling air L can flow between the two coil rings 3, 4 and between the second coil ring 4 and the sleeve 5. This enhances the efficacy of the cooling.

Figure 8:
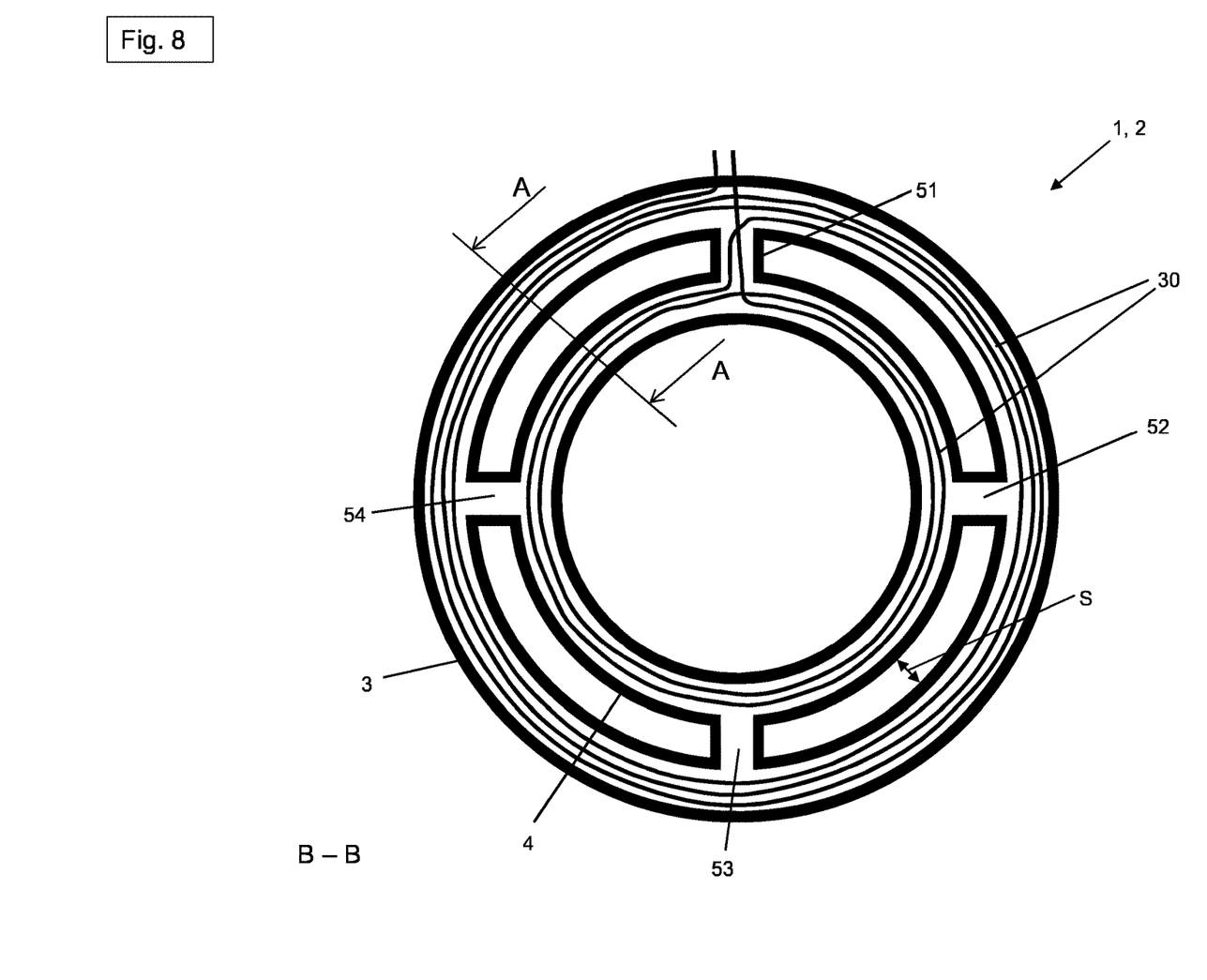
FIG. 8: a sectional view through the coil device with the first and second coil rings along section B-B in FIG. 7.

As is shown in FIG. 7, the second coil ring 4 is joined to the first coil ring 3 by means of seven webs 51, 52, 53, 54, 55, 56, 57. However, it is also possible for more or fewer than the seven webs 51, 52, 53, 54, 55, 56, 57 to be provided in order to join the second coil ring 4 to the first coil ring 3. At least one of the webs 51, 52, 53, 54, 55, 56, 57 is configured in such a way that the winding wire 30 of the first and second coil rings 3, 4 is connected. In other words, this is a single winding wire 30 that is wound in the first and second coil rings 3, 4. Here, the at least one web 51, 52, 53, 54, 55, 56, 57 that serves to join the first and second coil rings 3, 4 is configured so as to be hollow. FIG. 8 shows, for instance, a coil device 1, 2 in which the second coil ring 4 is joined to the first coil ring 3 by means of just four webs 51, 52, 53, 54.

The ring-shaped space S between the first and second coil rings 4,4 is formed by the special arrangement of the first and second coil rings 3, 4 (in particular, see FIGS. 4, 6 to 5). The shape of the space S essentially matches the corresponding inner and outer contours of the first and second coil rings 3, 4. The space S is configured such that a fluid or medium, especially an air stream L, can flow through it in order to cool the coil device 1, 2. In this process, the cooling of the coil device 1, 2 is based on the convection principle. The air stream L can also be referred to as a convection stream. Therefore, on the one hand, the division of the coil device 1, 2 into at least a first and a second coil ring 3, 4 prevents too many heat-generating wire windings 30 from being laid over each other and also prevents excessive heat from being generated inside the coil device 1, 2. On the other hand, a ring-shaped space S between the individual coil rings 3, 4 allows cooling air L to flow through the individual coil rings 3, 4 in order to cool the coil device 1, 2. The air stream L flowing through the space S and along the individual coil rings 3, 4 reduces heat generation and effectively prevents overheating of the coil device 1, 2.

The invention claimed is:

1. A power tool comprising:
   a percussive mechanism with a percussive element to generate a percussive pulse onto a tool, the percussive element being reversibly movable along a longitudinal axis by a magnetic field in order to generate the percussive pulse; and
   at least a first and a second coil device to generate the magnetic field, each of the first and second coil devices having at least a first coil ring with a first radius and a second coil ring with a second radius, whereby the first radius of the first coil ring is greater than the second radius of the second coil ring, so that a space is formed, at least in certain areas, between the at least first and second coil rings, a fluid serving to cool the first and second coil devices flowable through the space;
   wherein the first and second coil rings are arranged with respect to each other in such a way that the distance between an upper end of an uppermost coil ring and a lower end of a lowermost coil ring of the first and second coil rings is greater than a sum of a first height of the uppermost coil ring and of a second height of the lowermost coil ring.

2. The power tool as recited in claim 1 wherein the first or second coil device has more than the first and second coil ring so that a plurality of corresponding spaces are present between the individual coil rings, at least in certain areas.

3. The power tool as recited in claim 1 wherein the first and second coil rings are arranged in a vertical plane.

4. The power tool as recited in claim 1 wherein each of the first and second coil rings has a maximum of two to fourteen winding layers of an electric conductor.

5. The power tool as recited in claim 4 wherein each of the first and second coil rings has a maximum of seven or eight winding layers of an electric conductor.

6. The power tool as recited in claim 1 wherein the space between the first and second coil rings has a height of 2 mm to 10 mm.

7. The power tool as recited in claim 1 wherein the fluid is an air stream.

8. A method for operating the power tool as recited in claim 1 comprising flowing the fluid through the space.

9. A hammer drill comprising the power tool as recited in claim 1.

10. A chiseling hammer drill comprising the power tool as recited in claim 1.

11. The power tool as recited in claim 1 further comprising a sleeve, the first coil ring and the second coil ring being positioned around the sleeve.

12. The power tool as recited in claim 11 wherein the percussive element is positioned inside the sleeve.

13. The power tool as recited in claim 12 further comprising a spring at a rear end of the sleeve serving to brake and return the percussive element.

14. The power tool as recited in claim 13 further comprising an intermediate striking pin element between the tool and the percussive element.

15. The power tool as recited in claim 13 wherein the spring is a helical spring.

16. The power tool as recited in claim 1 further comprising a tool socket between the percussive mechanism and the tool, the tool socket for holding the tool socket.

17. The power tool as recited in claim 16 wherein further the tool socket is arranged coaxially with the percussive mechanism.

18. The power tool as recited in claim 1 further comprising an intermediate striking pin element between the tool and the percussive element.

19. The power tool as recited in claim 1 further comprising a fan for generating flow of the fluid.

* * * * *